(12) United States Patent
Ramirez Garcia (10) Patent No.: US 10,801,915 B2
(45) Date of Patent: Oct. 13, 2020

(54) WATER LEAK DETECTOR DEVICE AND LEAK DETECTION PROCEDURE

(71) Applicant: AGANOVA S.L., Malaga (ES)

(72) Inventor: Agustin Ramirez Garcia, Malaga (ES)

(73) Assignee: AGANOVA S.L., Malaga (ES)

( * ) Notice: Subject to any disclaimer, the term of this patent is extended or adjusted under 35 U.S.C. 154(b) by 92 days.

(21) Appl. No.: 15/570,617

(22) PCT Filed: Mar. 11, 2016

(86) PCT No.: PCT/ES2016/070157
§ 371 (c)(1),
(2) Date: Oct. 30, 2017

(87) PCT Pub. No.: WO2016/174284
PCT Pub. Date: Nov. 3, 2016

(65) Prior Publication Data
US 2018/0283978 A1    Oct. 4, 2018

(30) Foreign Application Priority Data
Apr. 28, 2015   (ES) .................................. 201530574

(51) Int. Cl.
*G01M 3/24* (2006.01)
*G01M 3/00* (2006.01)

(52) U.S. Cl.
CPC ............ *G01M 3/246* (2013.01); *G01M 3/005* (2013.01)

(58) Field of Classification Search
CPC ............................. G01M 3/246; G01M 3/005
(Continued)

(56) References Cited

U.S. PATENT DOCUMENTS

| 4,016,748 A | 4/1977 | Boyens ...................... 73/40.5 R |
| 4,894,539 A | 1/1990 | Hurst ............................ 250/303 |

(Continued)

FOREIGN PATENT DOCUMENTS

| WO | WO 2004/059274 A2 | 7/2004 |
| WO | WO 2006/081671 A1 | 8/2006 |
| WO | WO 2009/155708 A1 | 12/2009 |

OTHER PUBLICATIONS

International Search Report dated Sep. 1, 2016 in corresponding PCT International Application No. PCT/ES2016/070157.
(Continued)

*Primary Examiner* — Peter J Macchiarolo
*Assistant Examiner* — Monica S Young
(74) *Attorney, Agent, or Firm* — Ostrolenk Faber LLP (57) ABSTRACT

A device is produced as a small sphere with neutral buoyancy, within which there is, at least, one hydrophone that is connected to a signal processor, which stores the information on a memory card and that is powered by at least one battery. This signal processor has a clock module, through which the sailing time elapsed for each audio signal received by the hydrophone is recorded in the memory. Therefore, based on the sailing time, the exact position of the detected anomalies or leaks can be ascertained. The device is complemented by a series of external synchronisation systems, laid out every certain distance, by which the position error that could be accumulated by the device is neutralised. Thus, a simple device is attained, which is cheap, solid, durable and highly effective.

9 Claims, 4 Drawing Sheets (58) Field of Classification Search
USPC .......................................................... 73/40.5
See application file for complete search history.

(56) References Cited

U.S. PATENT DOCUMENTS

| | | | |
|---|---|---|---|
| 2006/0101915 A1* | 5/2006 | Thompson ............ | G01M 3/246 73/592 |
| 2008/0204008 A1* | 8/2008 | Paulson ................. | F16L 55/38 324/220 |
| 2010/0064775 A1* | 3/2010 | Ben-Mansour ........ | G01M 3/22 73/40.5 A |
| 2011/0103189 A1* | 5/2011 | Paulson ................. | F16L 55/48 367/89 |
| 2013/0186181 A1 | 7/2013 | Ben-Mansour et al. ....... | 73/49.1 |
| 2014/0174186 A1 | 6/2014 | Salomon ......................... | 73/587 |
| 2015/0155920 A1* | 6/2015 | Talnishnikh ............. | H04B 7/04 455/500 |
| 2018/0149546 A1* | 5/2018 | Boyes .................. | G01M 3/005 |

OTHER PUBLICATIONS

Written Opinion dated Sep. 1, 2016 in corresponding PCT International Application No. PCT/ES2016/070157.

International Preliminary Report on Patentability dated Oct. 10, 2017 in corresponding PCT International Application No. PCT/ES2016/070157.

* cited by examiner

WATER LEAK DETECTOR DEVICE AND LEAK DETECTION PROCEDURE

CROSS-REFERENCE TO RELATED APPLICATIONS

The present application is a 35 U.S.C. §§ 371 national phase conversion of PCT/ES2016/070157, filed Mar. 11, 2016, which claims priority to Spanish Patent Application No. P201530574, filed Apr. 28, 2015, the contents of which are incorporated herein by reference. The PCT International Application was published in the Spanish language.

OBJECT OF THE INVENTION

This invention relates to a device that has been specially designed to detect leaks in large diameter water pipes using low-frequency sound that causes an anomaly in the water of a large diameter pipe in the load subjected to high pressures.

The object of the invention is to provide a device that, besides allowing said detection, is reliable, simple and low-cost.

The object of the invention also includes the means to insert and remove the device, as well as the actual procedure used to detect the exact location of the leak.

BACKGROUND OF THE INVENTION

Concerning the scope of the practical application of the invention, in current water leak detection devices, particularly those focused on transportation pipelines, the leak detection process generally uses a moisture measurement close to the water leak. This measurement is carried out using different devices, for either measuring moisture, measuring temperature or a voltage caused by an induced current that varies depending on the moisture of the location.

In document U.S. Pat. No. 4,016,748 A, a method and a device to detect leaks in a pipe are presented. Starting with a fluid that flows through a pipe at a pressure above atmospheric, the method envisages the fitting inside the pipe of a floating leak sensor that is sensitive to the pressure and speed differences caused by a leak, moving the leak sensor through the pipe together with the fluid, with which the sensor stops moving once it has detected a leak.

This invention solves the first leak detection in a duct, but stops when it is found and is relative to the size of the leak that has occurred in the duct. Therefore, the device described in document U.S. Pat. No. 4,016,748 A can be used to detect a first leak in a pipe, but it does not allow to detect subsequent possible leaks.

There are also leak detection devices such as those described in document US20130186181 A1, which features a rigid body that is elastically supported within an outside cage and is moved by a suction force generated by a local pressure gradient arising from a leak within a pipe network. Nevertheless, this method solves the problem of detecting water leaks inside a pipe, but with a distance to the leak proportional to the pressure gradient generated by the leak. This invention is intended to provide a solution for the entire network of pipes through which water is transported and distributed.

Other leak detection methods based on invention patent US20140174186 A1 are also known. Said patent provides a system to detect leaks of a fluid in a pipe network using water flow meters and vibration detectors. In this invention, a processor analyses the signals of the flow meters. The flow circulating through the inside of the pipe network in each section should be measured. These systems are used to detect large leaks, as the flow meters must capture the flow difference between two points. If the leak is small, the value is insignificant.

Furthermore, invention U.S. Pat. No. 4,894,539 describes a method for ascertaining the position of a leak in a duct or pipe, especially a small-diameter one, in which a short piece of coax cable is inserted, which carries a short duration radioisotope into the duct or pipeline and which is forced to move throughout the piping. With this invention, leak detection is partially solved but only in small-diameter pipelines.

Trying to skirt this problem, invention patent WO 2006/081671 is well known. It describes a device materialised as a sort of sphere, fitted with a magnetic sensor, an accelerometer and means for collecting data. It can include an acoustic sensor, such as a hydrophone.

By using hydrophones, i.e., by the emission of sounds and the analysis of the sounds received back by the device, as these are emitted into the inside of a pipeline, water leaks are detected in a highly effective manner due to the difference in response compared to a leak-free pipe. However, not only is it necessary to detect the said presence, but it is also essential to pinpoint the exact position where the leak was detected.

In this sense, the device described in invention patent WO 2006/081671, provides for certain means for this purpose that are complex and expensive, as well as inaccurate.

For this purpose and more specifically, said device has been prepared for the sphere into which it is materialised to be fitted with features that make it float for it to move by rolling through the pipe or pipelines involved. Thus, its position shall be calculated by using an accelerometer to control the number of revolutions it spins along the wall of the pipeline. This complicates the internal structure of the device, in addition to obtaining a series of error-prone readings, if the sphere slides instead of rolling. Moreover, the risk of possible measurement errors significantly increases when the length of the pipes to be analysed is very long, as there are no means to synchronise the device after a certain pre-established distance has been travelled.

DESCRIPTION OF THE INVENTION

The advocated device meets in a fully satisfactory manner the problems previously exhibited in each of the mentioned aspects, providing a device that is much more accurate, structurally simple and more cost-effective and reliable.

To do this and based on the aforementioned conventional structuring, in other words, by including a sound sensor device, particularly with a hydrophone device and an electronic system that classifies the sound received by the hydrophone to univocally identify a leak in the subject piping, the device of the invention materialises as a sort of sphere. This sphere does not need means to make it float, insofar as it is not intended to rotate on the inner surface of the piping nor requires a coating of an adherent material that ensures said rotation. Indeed, this device moves together with the flow of the circulating water through the piping, with a neutral buoyancy. Thus, the device's sliding or rolling does not affect the accurate ascertaining of its position, when a leak has been detected in the pipe.

Consequently, and as mentioned above, the device is fitted with an aquatic hydrophone associated to a signal adaptor and a processor capable of classifying the signal received by the hydrophone. Therefore, the sound that indicates an anomaly (a water or an air pocket leak) inside a large diameter pipeline has a specific and known sound spectrum. More specifically, the sound triggered by a water leak in a large diameter pipe under high pressures, ranges from an audible sound of between 20 Hz and 20 KHz, making it easy to differentiate and classify. In fact, the amplitude of the sound triggered by a leak inside a large diameter pipe increases its value as the pressure increases inside the pipe.

If there are no disturbances inside a pipe, the sounds detected inside a pipe are highly likely due to an anomaly in the water of a large diameter pipeline. By fitting a hydrophone that captures this signal, when the pipe is full of water, it eliminates the need to empty the large diameter pipeline and fill it with gas. This also reduces the water consumption from the emptying and filling of the water conveyance ducts.

The hydrophone and processor are attached to a battery and covered by a hollow casing. The assembly is inserted into the large diameter pipeline through the available access valves in the pipeline access manholes, quickly and easily.

In accordance with the essence of the invention, the microprocessor has a clock module, which is used to assign the time elapsed since the insertion of the device to each one of the acoustic signals received and interpreted by it.

For the activation of this timing, the device is fitted with a triggering system through which the device starts to monitor the time elapsed since it has been moving through the inside of the pipe, by which the water flow, and consequently the speed at which the device assembly is moving, are known.

The triggering control system is used to take the device from the switched off mode to the switched on mode.

The device is sealed and cannot be opened. Thus, an additional connector is required for the start up process. It consists of two main parts: a USB connector and the control circuitry.

The USB connector is used to charge the internal battery, as well as to make a physical connection between the internal clock module and the outside.

The control circuitry creates a pulse that makes the device go from the on to the off mode and vice versa. It is comprised of a strip or cable that connects the USB to the control circuitry, an ON/OFF push button that generates an electric current which, in turn, makes the control circuitry to activate the device or not. It also includes a status LED, which signals whether it is in on or off mode.

Likewise, the device is fitted with a communication module, used to send information, from inside the device to outside, without having to open it.

Information is sent in at least one of the three following manners: Bluetooth, long-range radio communication or ultrasound communication.

Bluetooth communication is used for bulk data transfers to the outside, as well as for the identification of the device.

Ultrasound communication is used to establish communication with the device inside the piping.

Long-range radio communication is used to establish communication with the device if any of the other communication methods fail, it being a redundant communication system.

These means of communication of the device are extremely effective when it comes to eliminating possible measurement errors of the device. In this regard, a link has been made with external synchronisation systems every certain distance all along the piping, through which the device can "reposition" and the anomalies encountered all along the tubing are calculated.

These synchronisation systems define known reference points. Thus, the positioning error and the uncertainty that may exist in the distance calculation is zero at the known point.

These systems can be used to create beginning/end sections for a limited and known travel path. By fitting them in the device's path, operability is improved, as greater distances can be covered, keeping a constant error margin, allowing to minimise errors within known stretches if they are divided into smaller ones.

For this purpose, the synchronising systems are comprised of a communication module, a clock module and a power-supply module.

The communication module is used to send data from the device to outside the piping. That information can be stored in the synchronisation system or can be sent to an external server that stores the information using a GSM/GPRS module. Communication can be one-way communication, from the synchronisation system to the device, using beaters, tone generators and Bluetooth or bi-directional communication, between the synchronisation system and the device, using radio or ultrasound communications.

The one-way communication system emits a pattern known to the device from outside the pipe to the communication module, so that it identifies that pattern and acts accordingly. The pattern can be generated by a beater system, a tone generator system or a Bluetooth module.

The purpose of the device is to know the location of the anomalies encountered inside a pipeline. To do this, audio recorded by the recording system and extracted through the start up control module is used. Using the recorded audio the anomalies inside the piping can be detected, as well as the time that it has taken the device to reach the anomaly from the start. Once the time elapsed up to the anomaly and the water speed are known, thanks to a series of flow meters fitted in the insertion system, one can calculate the distance to the anomalies, thanks to the uniform rectilinear motion equation, where only the direction of propagation of the water is taken into account.

Using only a hydrophone as a data system reduces the processing time compared to other anomaly detection systems.

As it only takes into account the water propagation direction, the processing time drops, as it only has to calculate the distance based on the time and speed.

To perform this calculation, it is necessary to know the positions (of the insertion system, of the extraction system, of the synchronisation systems), the speed of the flow at the time in which device was sailing through the inside of the pipe and the elapsed time, since the device was inserted into the pipeline, up until the detection of the anomaly.

The positions are used to know the distance between the insertion, synchronisation and extraction points. To know these, the map of the place is used. If there is no mapping, GPS is used. The points of the synchronisation systems are used to make a calculation by stretches, reducing the error of the known stretch.

The flow speed is known thanks a flow meter fitted in the insertion or extraction system. This speed is used to know the distance based on time, thanks to the uniform rectilinear motion equation.

To minimise error, algorithms are used to identify non-measurable states of a dynamic system, subjected to white noise.

Furthermore, the housing may be made of different materials or a set of these, such as plastic. It can optionally include a wireless communication module, which sends real-time sound from the inside of the pipe to a receiver communication module on the outside of the pipe.

With regards to the insertion and extraction system, an insertion device is defined that is comprised of a rod, a plate, an O-ring, a flexible metal sleeve and a flow meter.

The device is fitted inside the metal sleeve, which is connected to the inlet of the large diameter pipe. The valve of the large diameter pipe is opened and pushed into the pipe using the rod, so that the flow meter measures the water speed.

Together with its anchorages, the metal sleeve is used to create an area with the same pressure as that of the inside of the large diameter pipe, to which one has access. The device is inserted into this sleeve.

The rod is used to convey the movement from the upper part of the sleeve, where the device is, to the lower part of the sleeve, i.e., inside the pipe.

The O-ring is required as the pressure inside the metal sleeve is high. Were this O-ring not used, water would come out of the joint.

The plate is required so that the device does not slip when it is pushed by the rod.

Moreover, the extraction system is used to remove the sphere from inside the pipe under load to the outside. It is therefore made up of a metal sleeve, a rod, a net, flexible plates, a camera, an arrival detector, an O-ring and a flow meter.

For this purpose, the extraction system is fitted in a valve of the large diameter pipe, it is joined to the metal sleeve and it is pushed to the end of the pipe, where the plates open and the net expands.

The net traps the device when it approaches, as the camera displays it and the arrival detector is activated.

Next, the rod is pulled upwards and the device is removed from inside the sleeve.

Likewise, the flow meter measures the water speed, an essential piece of information to determine the exact distances at which the possible leaks are located.

Together with its anchorages, the metal sleeve is used to create an area with the same pressure as that of the inside of the large diameter pipe, to which one has access.

The net is inserted into this sleeve and subsequently the device is collected.

The rod is used to convey the movement from the upper part of the sleeve, where the extraction system is, to the lower part of the sleeve, i.e., inside the pipe. Subsequently, when the device is detected, the movement is conveyed from the inside of the pipe, where the collection system is located, up to the top part of the metal sleeve, where it will be collected.

The O-ring is used as the pressure inside the metal sleeve is high. Were this O-ring not used, water would come out of the joint.

The camera is fitted to the lower part of the collection system, facing upwards. This allows the following actions to be performed:

1) Position the collection system in a perpendicular manner to the direction of the pipe.

2) Verify the flow circulating through the inside of the pipe, to corroborate that the speed is sufficient to make the device sail.

3) When the device reaches the collection system, to be able to see it directly.

The camera has a video output that is connected to an external monitor on the outside of the pipe.

The net of the collection system must be made of a material that is flexible and resistant to the blow caused by the arrival of the device.

Thus, we attain a device for leak detection in pipes that is extremely simple, solid, effective, durable and cost-effective.

DESCRIPTION OF THE DIAGRAMS

To complement the description given below and in order to help get a better understanding of the features of the invention, in accordance with a preferred example of its practical implementation, attached as an integral part of said description are a set of diagrams. By way of example and without limitation, they represent the following:

Diagram 1. Displays a representation of a front overhead of a water leak detector in pipelines implemented in accordance with the object of this invention.

Diagram 2. Shows a view in perspective and as a cross section in accordance with an imaginary vertical and diametric plane of the device in the previous diagram.

Diagram 3. Shows an exploded view of the device in the previous diagrams.

Diagram 4. Displays a profile and cross section view of an access to a large diameter pipe through which the device of the invention is inserted, showing the device used to perform the insertion in a simple manner.

Diagram 5. Displays a view similar to that of diagram 4 but relating to the removal means provided for the device of the invention.

Diagram 6. Displays a view of the lengthwise section of a stretch of large diameter pipe with a water leak in its wall. It can be observed that said leak produces a different sound than that of the rest of the piping when an acoustic signal is applied to it, which is easily identifiable by the device of the invention.

Diagram 7. Displays the perspective detail of the means of collection of the device, at the lower level of these.

Diagram 8. Displays the detail of the means of collection shown in diagram 7, in which one can see a light-camera assembly that facilitates the tasks for the removal of said device.

PREFERENTIAL IMPLEMENTATION OF THE INVENTION

Figure 1:
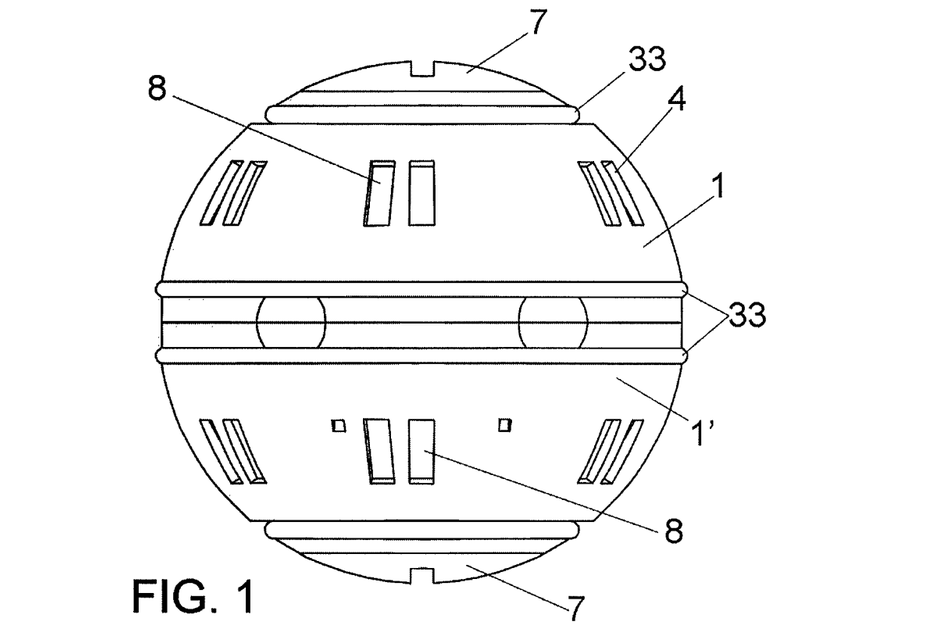
Figure 2:
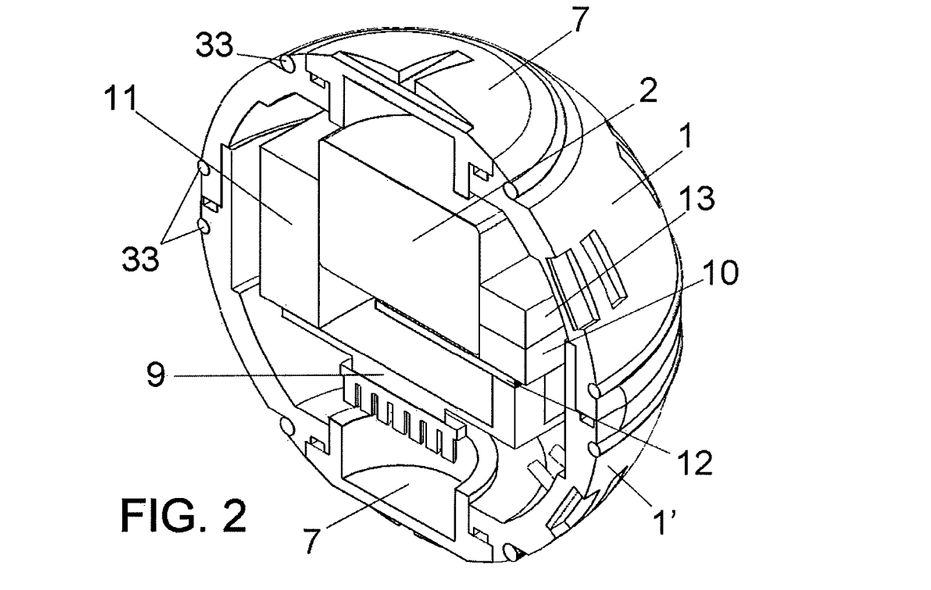
Figure 3:
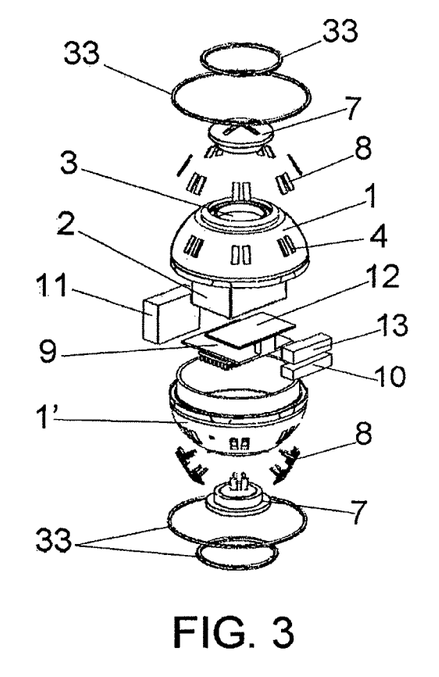

As can be seen in the reviewed diagrams and particularly in diagrams 1 to 3, the device of the invention is comprised of an essentially spherical casing, obtained from two semi-casings (1-1') that can be coupled and sealed between each other, within which there is a hydrophone (2), the semi-casings being fitted with holes (3) and windows (4) to which connections are fitted (7-8), connected to the hydrophone (2), in order to capture the sound that occurs in the water.

The hydrophone (2) is connected to a signal processor (9), which stores the information on a memory card (10) and is powered by a battery (11). This signal processor (9) is fitted with a clock module (12) or timer, through which the receipt of the signals is associated with the specific time at which they were received. Thus, from the water speed or flow, the exact location of the detected leak can be ascertained with great accuracy, based on the time elapsed until the time of its detection.

The housing is complemented by a series of peripheral grooves into which the related gaskets are inserted (33). They constitute adherent mediums that allow the device to roll in the event of a jam. However, as has already been mentioned above, the means that determine the positioning of the device and, consequently, of the possible leaks, are fully functional and regardless of the relative rotation position or otherwise in which the device is at the time.

These joints are in charge of increasing the drag surface so that the force of the water moves the device. Due to having neutral buoyancy, the device sails through the area of the pipeline that has the highest water speed, that is, the centre of the pipeline.

The device can be fitted with a communication module (13), so that it can communicate on a real-time basis with a series of synchronisation systems, arranged externally and every certain distance all along the piping. The communication module is used to send data from the device to outside the pipe. Said data may be stored in the synchronisation system or be sent to an outside server that stores the information by means of a GSM/GPRS module.

Communication can be one-way communication, from the synchronisation system to the device, using beaters, tone generators and Bluetooth or bi-directional communication, between the synchronisation system and the device, using radio or ultrasound communication. By using said synchronisation systems, the positional parameters of the device are reset, preventing the accumulation of errors in the calculation of the distance travelled by it.

Figure 4:
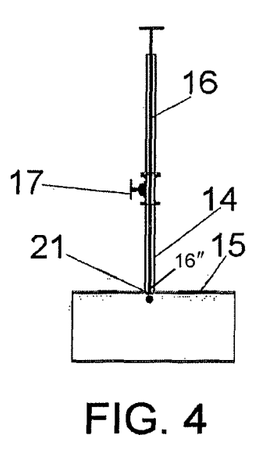

Diagram 4 shows how the device is inserted into a large diameter pipeline using the access system (14) of the manholes of the water distribution network. In order to ensure that the leak detection system enters the pipeline (15), a rod is connected (16) with the access system though the access valve (17). Thus, the access valve is opened (17) and the leak detector is pushed in using the rod (16). More specifically the rod is inserted by means of its lower end through a metal sleeve (21) that is used, together with its anchorages, to create an area with the same pressure as that of the inside of the large diameter pipe, to which one has access. A flow meter 16" may be attached to the rod 16.

The assembly is complemented with a non-referenced O-ring, which is used as the inside pressure of the metal sleeve is high. Were this O-ring not used, water would come out of the joint.

Figure 5:
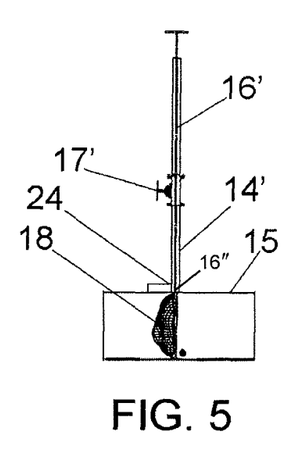

To ensure the proper removal of the leak detector, diagram 5 shows a device with a rod (16'), which has a net on its lower part (18) for receiving the device. Similar to what occurs with the insertion device, the rod (16') is passed through the access valve (17) of the access inlet (14') and is joined by means of an O-ring.

Figure 7:
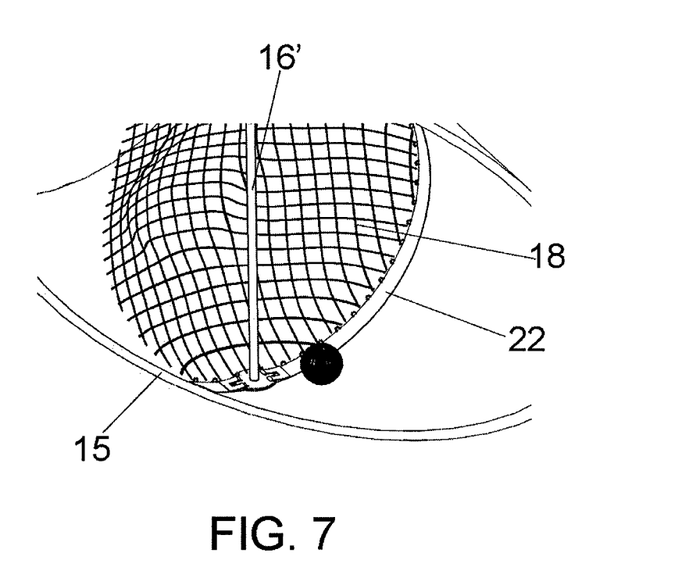
Figure 8:
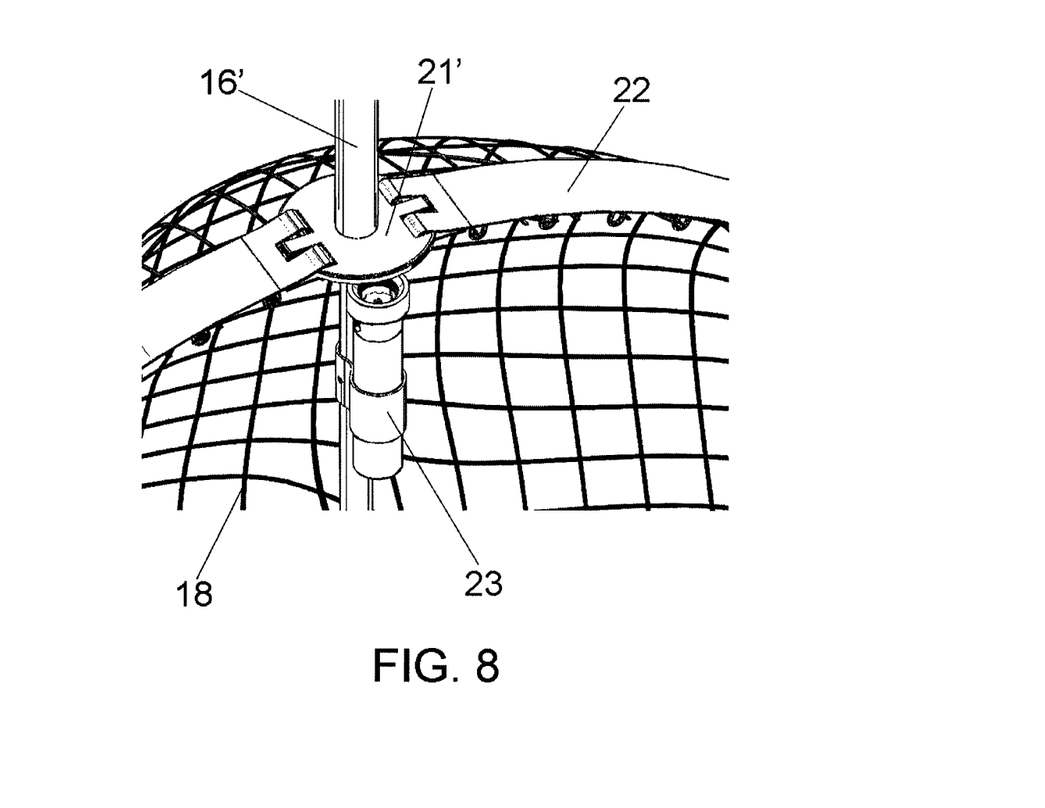

The device is complemented with a metal sleeve (21'), a couple of flexible plates (22) to which the net is attached (18) and electronic equipment (23) that includes a camera, an arrival detector and a flow meter.

Thus, the extraction system is fitted in a large diameter pipe valve, it is joined to the metal sleeve and it is pushed to the end of the pipe, where the plates open and the net expands.

The net traps the device when it approaches, as the camera displays it and the arrival detector is activated.

Next, the rod is pulled upwards, the plates close and the device is removed from inside the sleeve.

Likewise, the flow meter measures the water speed, an essential piece of information to determine the exact distances at which the possible leaks are located.

Figure 6:
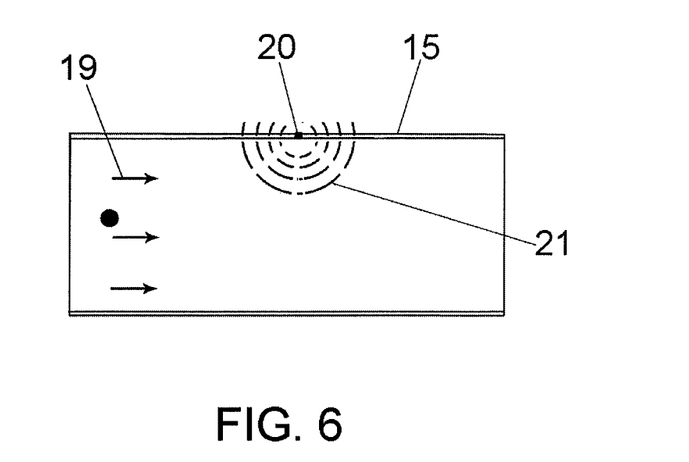

As can be seen in diagram 6, dragged by the force of the water current (19), the leak detector system will start sailing through the pipeline (15). When a water leak is detected (20) on the wall of the piping (15), it will emit a different sound (21) that is captured by the hydrophone (2).

With regards to the dimensions of the sphere, even though these may vary due to different design criteria, as an example, it may have a radius of between 50 and 150 mm and a thickness of 0.8 mm, with hermetic sealing and preferably made of plastic, although it may be made of other materials or combinations of these.

The invention claimed is:

1. A device for detecting water leaks in pipelines, the device comprising:
    a spherical casing;
    at least one hydrophone as a receiver of audio signals, the hydrophone being located within the spherical casing and is connected to a signal processor within the casing, which signal processor comprises a non-transitory memory card for storage of audio information corresponding to the audio signals received by the hydrophone and which is powered by at least one battery, the signal processor having a clock module configured to record in the memory card sailing time elapsed for each audio signal received by the hydrophone,
    wherein the spherical casing includes a plurality of external and spaced peripheral grooves, and a plurality of gaskets received in the peripheral grooves, and
    wherein the gaskets have an adhesive texture that facilitate rolling in the event of a possible jam, and
    wherein the device has neutral buoyancy.

2. The device for detecting water leaks in pipelines in accordance with claim 1, further comprising a communication module located within the spherical casing and configured to communicate on a real-time basis with a series of spaced synchronization systems residing all along the pipeline, from which the start and end of delimited and known stretches are defined, in which there is no positioning error, the device being configured to have its positional parameters reset by each synchronization system, the synchronization systems comprising a communication module, a clock module and a power-supply module.

3. The device for detecting water leaks in pipelines in accordance with claim 1, further comprising a one-way or a bidirectional communication module.

4. The device for detecting water leaks in pipelines in accordance with claim 3, wherein the communication module is configured for use with beaters, or tone generators, or Bluetooth, or in the case of bi-directional communication, communications using radio or ultrasound.

5. A system that comprises a device for detecting water leaks in pipelines and an insertion accessory for the insertion into a pipeline the device for detecting water leaks in pipelines, the device comprising,
    a spherical casing;
    at least one hydrophone as a receiver of audio signals generated by mechanical signals, the hydrophone being located within the spherical casing and is connected to a signal processor, which signal processor includes a non-transitory memory card for storage of audio information corresponding to the audio signals received by the hydrophone and is powered by at least one battery, the signal processor having a clock module configured to record sailing time elapsed for each audio signal received by the hydrophone in the memory card, the insertion accessory comprising an insertion rod of a suited size to be inserted through an access valve to the pipeline to be monitored, a metal sheath, and a flow meter attached to the insertion rod.

6. A device for detecting water leaks in pipelines in accordance with claim 1, wherein the spherical casing comprises two semi-spheres that can be coupled and sealed, and are fitted with holes and windows through which connections are made with the hydrophone.

7. The device for detecting water leaks in pipelines in accordance with claim 1, which includes a start up system through which the device starts to monitor the time it has been travelling along the inside of the pipeline.

8. The device for detecting water leaks in pipelines according to claim 1, further comprising a battery to power the device.

9. A system in accordance with claim 5, further comprising a retriever that comprises a rod, a camera attached to the rod, a net that retrieves the device, a metal case, flexible plates, an arrival detector, and a flow meter.

* * * * *